United States Patent [19]

Genba et al.

[11] Patent Number: 4,474,907
[45] Date of Patent: Oct. 2, 1984

[54] FIBER-REINFORCED HYDRAULICALLY SETTING MATERIALS

[75] Inventors: Tsuneo Genba; Akio Mizobe; Masaki Okazaki, all of Okayama, Japan

[73] Assignee: Kuraray Co., Ltd., Kurashiki, Japan

[21] Appl. No.: 506,992

[22] Filed: Jun. 23, 1983

[30] Foreign Application Priority Data

Jul. 6, 1982 [JP] Japan ................................. 57-118051

[51] Int. Cl.$^3$ ............................................ C04B 31/34
[52] U.S. Cl. .................................... 523/206; 523/221; 524/4
[58] Field of Search ...................... 523/221, 206; 524/4

[56] References Cited

U.S. PATENT DOCUMENTS 3,042,681  7/1962  Sefton ..................................... 524/4
3,997,489  12/1976  Coker ..................................... 525/57
4,218,258  8/1980  Rothberg ............................... 524/4
4,379,870  4/1983  Matsumoto ............................ 524/4

FOREIGN PATENT DOCUMENTS 2042607  9/1980  United Kingdom .................... 524/4

OTHER PUBLICATIONS

Derwent Abstract, 66861 E/32, J57106563, (7-1982), Kuraray.
Derwent Abst., 37829 K/16, J58041748, (3-1983), Denki Kagaku.
Derwent Abst., 14577 D/09, J55164241, (12-1980), Fuji Electric.
Derwent Abst., 40566 C/23, J55056050, (4-1980), Nippon Synth Chem. Ind.

Primary Examiner—Herbert J. Lilling
Attorney, Agent, or Firm—Oblon, Fisher, Spivak, McClelland & Maier

[57] ABSTRACT

Polyvinyl alcohol synthetic fibers are used as reinforcing materials for hydraulically setting materials, and by selecting the aspect ratio of the polyvinyl alcohol fiber and the dispersing agent for said fiber, adequate dispersion is made possible even with the fiber of 2 denier or less, thereby a higher reinforcing effect may be achieved.

The polyvinyl alcohol fiber is obtained by depositing 0.1–3.0% by weight based on the fiber of an oxidized polyethylene having an acid value of 5–150, and has a single yarn fineness of 0.5–2 denier, a length of 3–8 mm and an aspect ratio of 200–800, and the hydraulically setting material contains 0.1–4% by weight of said fiber.

13 Claims, No Drawings

FIBER-REINFORCED HYDRAULICALLY SETTING MATERIALS

BACKGROUND OF THE INVENTION

1. Field of the Invention

This invention relates to hydraulically setting materials reinforced with polyvinyl alcohol synthetic fibers (hereinafter referred to as PVA fibers).

2. Description of the Prior Art

As has hitherto been well known, asbestos fibers are representative inorganic fibers for forming hydraulically setting materials such as cement etc. and further exerting a reinforcing effect thereon. However, the supply of these asbestos fibers depends on the imports and the number of the producing countries is greatly limited from a global aspect, and also it is expected that their sources will be depleted and the asbestos fibers will inevitably be less available. Also from the standpoint of harmness to human health, there is danger concerning the environmental hygiene and pollution, for example, it is advisable to avoid inhalation of asbestos fibers, and therefore it is now under study to replace these asbestos fibers.

The present inventors have been studying fiber-reinforced hydraulically setting materials employing PVA fibers as substitute fibers for asbestos fibers and have come to the present invention, and therefore the present invention aims to present hydraulically setting materials having excellent folding endurance comparable to or better than the asbestos fiber-reinforced materials by employing PVA fibers.

The characteristics required of a fiber for reinforcing cement include, in addition to the fundamental mechanical properties such as strength, modulus etc., the shape factors of the fiber, i.e. the fiber diameter and fiber length, further properties relating to the stability in a cement material constituting a matrix, still further properties represented by the surface performance of the fiber, for example, interfacial bond strength, and the like, but apart from these required characteristics, it is a primary requisite for manifesting a reinforcing effect to actually disperse the reinforcing fiber sufficiently in the cement, and if the dispersion is inadequate, the reinforcing effect is greatly reduced. In general, dispersibility has a tendency to decrease with the reduction in thickness of the fiber. In fact, for example with glass fibers etc., single fibers are deliberately collected as chapped strands to make them thicker in order to improve such properties. Furthermore, also with synthetic fibers, in order to avoid aggravation of the dispersion, only those of several or higher denier are employed, and there is no literature relating to the region where the fineness is small.

In other words, the present situation is such that depending on the balance of the dispersibility and the reinforcing factors relating to the fiber shape, the reinforcing effect cannot be manifested unless a specific range of the fiber diameter is selected. Also with the case where PVA fibers are employed, known literature is concerned only with the use of 2 denier or higher in fear of poor dispersion, and no investigation has been made on the use of fibers of a smaller diameter range. In short, it is a matter of common knowledge that with less than 2 denier, the dispersion is poor and hence the reinforcing effect is small.

However, the present inventors have paid attention to that the PVA fibers are hydrophilic in nature and their dispersibility is relatively good as compared with other hydrophobic synthetic fibers or inorganic fibers and, based on this, have enabled adequate dispersion even with less than 2 denier (dr) by selecting the aspect ratio of the PVA fiber to be used and the dispersing agent for enhancing the dispersibility, thereby having been successful in obtaining a remarkable reinforcing effect.

SUMMARY OF THE INVENTION

Accordingly, this invention resides in a fiber-reinforced hydraulically setting material which contains 0.1–4% by weight of a polyvinyl alcohol synthetic fiber as a reinforcing material, said polyvinyl alcohol synthetic fiber being one which is obtained by using a PVA synthetic fiber preferably having strength of 5 g/dr or more and depositing on its surface 0.1–3.0% by weight based on the fiber of an oxidized polyethylene having an acid value of 5–150 and which has a single yarn fineness of 0.5–2 denier, a length of 3–8 mm and an aspect ratio of 200–800.

DETAILED DESCRIPTON OF THE PREFERRED EMBODIMENTS

In this invention, by combining the PVA fiber with its aspect ratio and the dispersing agent, the use of the PVA fiber having small fiber diameter of less than 2 denier has now been made possible, and further the theoretically expected direction that the less the fineness of the fiber, the better the reinforcing effect has now been also industrially materialized.

The PVA fiber to be used in this invention may be any, for example, (1) that obtained by wet spinning an aqueous solution of a completely saponified PVA into a bath of sodium sulfate and drawing and heat setting to give a total draw ratio of 600% or more, (2) that obtained by acetalizing the fiber of the above (1) under tension or under no tension, (3) that obtained by adding boric acid to a completely or partially saponified PVA, spinning it into a bath of caustic alkali-sodium sulfate and making the total draw ratio 900% or more, the boric acid being contained in the fiber in an amount of 0.1–0.7%, (4) that obtained by acetalizing the fiber of the above (3) under tension or under no tension, (5) that obtained by dry spinning a completely saponified PVA and making the total draw ratio 800% or more, and so forth.

In this invention, the utilization of the thin fiber diameter of less than 2 denier has now been enabled by combining the conditions of the specific dispersing agent and the shape factors of the fiber, and as the dispersing agent, an oxidized polyethylene having an acid value of 5–150 is employed. This dispersing agent is an oxidized polyethylene obtained by oxidizing a lower molecular weight polyethylene, and said oxidized polyethylene is that made into an O/W type emulsion by employing a nonionic emulsifying agent after alkali treatment. This emulsified polyethylene has carboxyl groups incorporated into the side chains, and the content of the carboxyl groups is so small that the hydrophobic nature is too high and hence the effect as the dispersing aid for the fiber is small. On the other hand, with higher than 150, the dispersing effect is not improved and therefore there is no economical merit.

This dispersing agent has various advantages, for example, the hydrophilic nature is high, which contributes to remarkable enhancement of the dispersibility of the fiber in the slurry on forming cement, the adhering effect with the cured cement is enhanced although the reasons are still unknown, the collecting properties are improved on fiber fabrication, stable production is possible, the handling properties are good, electrification may be avoided on cutting, air flotation may be prevented, and so forth.

The method for treating the PVA fiber with this dispersing agent may be selected among, for example, (a) (an in-process pre-drawing treating method) which comprises dip treating the filaments or tows after washing with water in the wet spinning step, under tension, subjecting them to the drying step and the drawing and heat setting step and winding up; (2) (an in-process post-heat setting treating method) which comprises dip treating the filaments or tows, which have been washed with water and dried in the wet spinning step and subsequently subjected to the drawing and heat setting step, under tension, drying and winding up; (3) (a post-treatment method) which comprises continuously washing and swelling with water the filaments or tows, which have once been wound up as the final product after spinning, under tension, introducing them into a treating pan, coating, drying and winding up; (4) (a post-cutting post-treatment method) which comprises cutting the filaments or tows wound up as the final product after spinning into the predetermined lengths, treating these short fibers by dipping in a treating solution and drying, and so forth. Among those, however, the method which does not mar the quality of the fiber and exhibits good adhesion and dispersion is the (1) in-process pre-drawing treating method. This is the best method because the fiber in the swollen condition is dipped in the treating bath under tension and dried and hence the adhesion of the PVA to the fiber surface is good and further the cohesion between the fiber is vanished by passing through the drawing and heat setting step, and thus the dispersibility and swelling tendency are enhanced. The (2) in-process post-drawing treating method is the same as the so-called fiber finish treatment. This does not change the quality of the fiber and permits easy treatment although the dispersibility is somewhat lowered. The (3) post-treatment method has a difficulty in that the already wound fiber has to be treated and processed again. However, this is suitable for small-scaled treatment. The (4) post-cutting treating method is operationally troublesome and has tendencies to reduce Young's modulus and to increase the degree of extension since the treatment is made under no tension, but is suitable for small-scaled treatment and batchwise treatment.

The pick-up of this dispersing agent onto the fiber is suitably 0.1-3% by weight of the fiber weight, preferably 0.3-1% by weight. If the build-up is less than 0.1% by weight, the effect on the dispersibility and adhesion cannot be expected, whereas if this exceeds 3% by weight, the fiber becomes sticky and hence difficult in handling, and also there is no enhancement in the effect, and therefore there is also no economical merit.

As the conditions for the shape factors of the PVA fiber to be used, where that having a fineness of not greater than 2 denier but not smaller than 0.5 denier is employed, the fiber length which can give the maximum reinforcing properties is 3-8 mm, and the aspect ratio is 200-800. If the fiber fineness is smaller than 0.5 denier, it is necessary to select a cut length of 3 mm or less in order to obtain constant dispersibility, but that having such a fiber length has a poor reinforcing effect. On the other hand, with greater than 2 denier, although it is advantageous in view of the dispersibility, the adhered surface area between the fiber and the cement matrix becomes smaller and hence the reinforcing effect is reduced. Where the aspect ratio is less than 200, although the dispersibility is good, the adhesion with the matrix is reduced and thus its reinforcing effect is not adequate. On the other hand, with higher than 800, the effect resulting from the use in combination with the aforesaid dispersing agent is diluted and the dispersibility is aggravated. Thus, from the standpoint of the aspect ratio, the cut length is most suitably 3-6 mm for 0.5 denier and 3-8 mm for 2 denier, and the cut length of 3-8 mm for 0.5-2 denier is an excellent range from the viewpoint of the dispersibility and the reinforcing effect.

Further, the tensile strength of the reinforcing fiber is desirably as high as possible, and that of at least 5 g/dr is effective. With smaller than 5 g/dr, the contribution of the reinforcing properties to the strength is small and thus this is not preferred.

The amount of the aforesaid PVA fiber to be added to a hydraulically setting slurry so as to manifest a reinforcing effect is suitably 0.1-4% by weight. With smaller than 0.1% by weight, the reinforcing effect is small, while with greater than 4% by weight, the dispersibility of the fiber is aggravated and thus this is not preferred.

Although it is also possible to use in combination asbestos fibers, vegetable fibers, glass fibers etc. in order to improve the sheet making properties and reinforcing properties, the present invention has a feature that the use of asbestos fibers can be particularly reduced by employing the PVA fibers. While the required performance of the intended plate material may be changed depending on the mixing ratio of the aforesaid combined materials, it is possible, in the present invention, to produce excellent plate materials such as the so-called asbestos slate plates, pulp cement plates, flexible plates, asbestos perlite plates, pulp cement plates etc. by replacing the asbestos fibers by the PVA fibers in the aforesaid mixing ratio of the combined materials.

As the matrix which constitutes the setting material, there may be generally employed various Portland cements such as ordinary, early high-strength, super early high-strength, moderate heat, sulfate resisting Portland cements etc., and mixed cements such as blast furnace cement, silica cement, fly ash cement, further, alumina cement, super rapid hardening cement, colloidal cement, oil well cement etc. In addition, hemihydrate gypsum, gypsum-slag system, slag, magnesium carbonate etc. may also be utilized.

As the inorganic fillers, 0-40% by weight of inorganic fillers may be added, examples of which include calcium carbide, and also clay, slate calcined powder, serpentine, silica, slag, mica, sepiolite, wollastonite, amorphous silica etc.

While the asbestos fibers may be employed usually regardless of kind, grade etc., it is generally to employ 0-25% by weight of chrysotile amosite of Class 4-7, blue asbestos etc. Further, lower-purity asbestos of various meshes out of Class 7, called the asbestos tailing, can also be employed. As the glass fibers, 0-20% by weight of alkali-resisting glass fibers incorporating $ZrO_2$, and also E-glass, shirasu (Japanese pumice) fibers, or rock wool are generally employed.

Natural fibers may also be employed in amounts of 0-15% by weight; for example bleached or unbleached pulp from coniferous trees and broadleaf trees may be employed, and of course reclaimed old paper, old newspaper etc. can also be employed. Further, in addition to the pulp, such materials as cotton, manila hemp, jute, kōzo (Japanese mulberry), mitsumata (Edgeworthia papyrifera) etc. may also be employed.

Of course, it is also possible to employ in combination with organic synthetic fibers. Examples of the synthetic fibers to be used include strands of split yarns fabricated from filaments or films of polyolefins such as polyethylene, polypropylene etc., chopped strands such as Kevlar of polyamides, e.g. Nylon 6, Nylon 66 etc., as well as polyacrylonitrile, polyvinyl chloride, polyvinylidene chloride, polyesters, polyimides, polyamideimides etc. Furthermore, as the synthetic pulp, that obtained by flush spinning a polymer produced from polyethylene, polypropylene or a mixture of these polymers with inorganic fillers may be employed.

EXAMPLES AND COMPARATIVE EXAMPLES

An aqueous solution of PVA having a polymerization degree of 1,710 containing 2% of boric acid was spun into a coagulating bath containing 18 g/l of caustic soda, 330 g/l of sodium sulfate and 1 g/l of boric acid, and thereafter introduced into a second bath similarly consisting of a sodium sulfate bath, wherein drawing at a draw ratio of 4 or 5 was effected, after which it was subjected to the neutralization and water washing steps, dried and wound up. By changing the output of the PVA aqueous solution in order to change the fineness, dried basic yarns having different degrees of fineness were obtained. Each basic yarn was further hot drawn, and thereafter surface treated using an emulsion containing 60% of an oxidized polyethylene having an acid value of 15, the build-up thereof being 0.8%. The obtained PVA fibers were those having a single yarn denier of 0.5, 1.0, 2.0 or 4.0 respectively. In order to obtain those fibers having different aspect ratio (AR) values, they were cut into the fiber lengths as set forth in Table 1. For comparison, those which had not been subjected to the oxidized polyethylene treatment were also cut similarly. Thereafter, they were incorporated into each cement matrix, and the dispersibility and the reinforcing effect were examined. The method for judging the dispersibility was to adjust the cement extract to 20° C., stir one liter of the fiber at a concentration of 2 g/l using a stirrer at a rotation of 500 rpm for 5 minutes, then make into a sheet employing a TAPPI sheet making machine and observe the dispersed condition of each sheet by the naked eyes. Further, in order to confirm the reinforcing effect, a formulation was prepared from 5% of asbestos (chrysotile 5R), 2% unbeaten unbleached fraft pulp, 2% of the PVA fiber and the balance of ordinary Portland cement. Molding was effected by the wet type sheet making process by making into a 10-ply laminite, pressurizing and thereafter curing under air dry conditions, four weeks after which the bending strength and the impact strength by Izod method were measured.

As the control for comparing the bend strength, that containing 15% of asbestos (chrysotile 5R) and 2% unbeaten unbleached pulp but no PVA fiber was also shown.

TABLE 1

| Test No. | Oxidized Polyethylene Treatment | Fineness (denier) | Fiber Diameter (mm) | Cut Length (mm) | AR Value | Dispersibility | Bending Strength Ratio | Impact Strength Ratio |
|---|---|---|---|---|---|---|---|---|
| Examples | | | | | | | | |
| 1 | Yes | 0.5 | 0.0075 | 3 | 400 | o | 1.25 | 1.3 |
| 2 | " | 0.5 | 0.0075 | 6 | 800 | o | 1.11 | 1.4 |
| 3 | " | 1.0 | 0.0106 | 4 | 377 | o | 1.23 | 1.3 |
| 4 | " | 2.0 | 0.015 | 3 | 200 | o | 1.00 | 1.7 |
| 5 | " | 2.0 | 0.015 | 8 | 533 | o | 1.08 | 1.4 |
| Comparative Examples | | | | | | | | |
| 6 | No | 0.5 | 0.0075 | 6 | 800 | x | 0.79 | 1.9 |
| 7 | " | 2.0 | 0.015 | 8 | 533 | x | 0.80 | 1.8 |
| 8 | Yes | 0.5 | 0.0075 | 9 | 1200 | x | 0.80 | 1.3 |
| 9 | " | 6 | 0.026 | 6 | 230 | o | 0.72 | 2.0 |
| 10 | 15% of Asbestos + 2% of Unbeaten unbleached pulp | | | | | o | 1.0 | 1.0 |

In Table 1, the bending strength ratio and the impact strength ratio are values obtained by taking the respective values in No. 10, i.e. 360 kg/cm$^2$ and 2.4 kg-cm/cm$^2$ as 1.0 respectively. In Test Nos. 1–5 which are for the fineness ranging from 0.5–2 denier, the dispersion is good, and the folding endurance as the bending strength is also improved in each case as compared with Comparative Example No. 10. Although Comparative Example Nos. 6 and 7 have similar values as in Examples as regards the AR values, since the treatment with the oil preparation has not been conducted, the dispersion was poor and there was no contribution to the folding endurance. In No. 9, although the fineness was increased to improve the dispersibility, but it did not lead to the improvement of the folding strength.

What is claimed is:

1. A fiber-reinforced hydraulically setting material which contains 0.1–4% by weight of a polyvinyl alcohol synthetic fiber as a reinforcing material, said polyvinyl alcohol synthetic fiber being that which is obtained by depositing on its surface 0.1–3.0% by weight based on the fiber of an oxidized polyethylene having an acid value of 5–150 and which has a single yarn fineness of 0.5–2 denier, a length of 3–8 mm and an aspect ratio of 200–800.

2. The fiber-reinforced hydraulically setting material according to claim 1 wherein strength of the polyvinyl alcohol synthetic fiber is about 5 g/dr or higher.

3. The fiber-reinforced hydraulically setting material according to claim 1 which contains up to 25% by weight of asbestos fibers.

4. The fiber-reinforced hydraulically setting material according to claim 1 which contains up to 15% by weight of vegetable fibers.

5. The fiber-reinforced hydraulically setting material according to claim 1 which contains up to 20% by weight of glass fibers.

6. The fiber-reinforced hydraulically setting material according to claim 1 wherein said setting material further comprises organic synthetic fibers.

7. The fiber-reinforced hydraulically setting material according to claim 3 wherein said asbestos fibers is chrysotile amosite of class 4–7, blue asbestos, or lower-purity asbestos of various meshes out of class 7.

8. The fiber-reinforced hydraulically setting material according to claim 4 wherein said vegetable fibers are bleached or unbleached pulp from coniferous trees and broad leaf trees, reclaimed old paper, old newspaper, cotton, manila hemp, jute, kōzō (Japanese mulberry), or mitsumata (Edgeworthia papyrifera).

9. The fiber-reinforced hydraulically setting material according to claim 5 wherein said glass fibers are alkali-resisting glass fibers incorporating $ZrO_2$, E-glass, shirasu fibers, or rock wool.

10. The fiber-reinforced hydraulically setting material according to claim 1 further containing up to 40% by weight of inorganic fillers.

11. The fiber-reinforced hydraulically setting material according to claim 10 wherein said inorganic filler is at least one member selected from the group consisting of calcium carbide, clay, slate calcined powder, serpentine, silica, slag, mica, sepiolite, wollastonite, and amorphous silica.

12. The fiber-reinforced hydraulically setting material according to claim 6 wherein said organic synthetic fibers is at least one member selected from the group consisting of split yarn fabricated from filaments or films of polyethylene and polypropylene, chopped strands of Nylon 6 or Nylon 66, polyacrylonitrile, polyvinyl chloride, polyvinylidene chloride, polyesters, polyimides, polyamideimides, and synthetic pulp obtained by flush spinning a polymer produced from polyethylene or polypropylene.

13. The fiber reinforced hydraulically setting material according to claim 6 wherein said setting material further contains inorganic fillers.

* * * * *